INVENTORS
George A. Neyhouse
Jack W. Savage
Ralph K. Shewmon
BY
John T. Marvin
THEIR ATTORNEY

June 20, 1961 G. A. NEYHOUSE ET AL 2,989,654
MULTI-SPEED DYNAMOELECTRIC MACHINE
Filed April 6, 1959 — 10 Sheets-Sheet 4

*Fig. 1d*

INVENTORS
George A. Neyhouse
Jack W. Savage
Ralph K. Shewmon

BY John T. Marvin
THEIR ATTORNEY

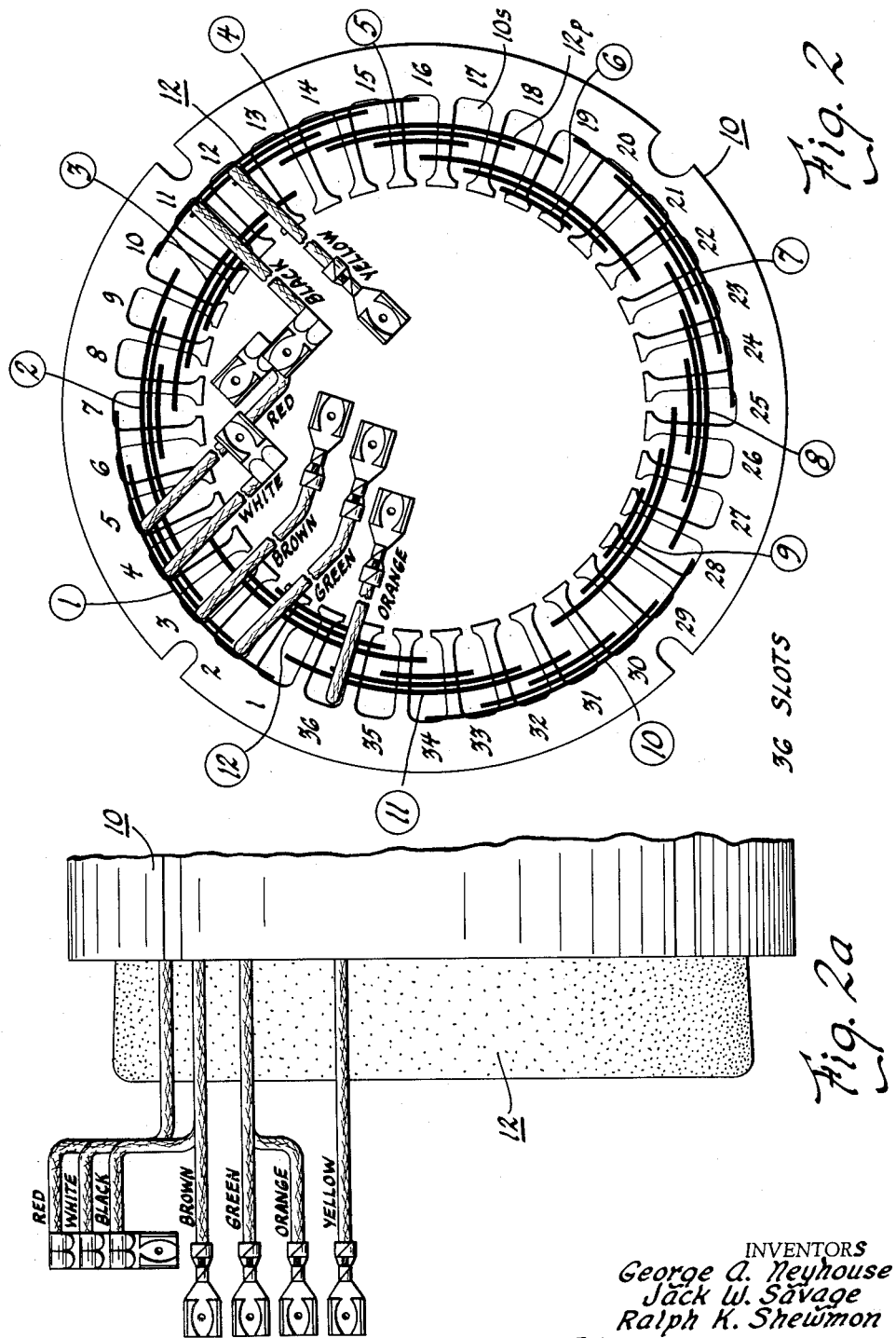

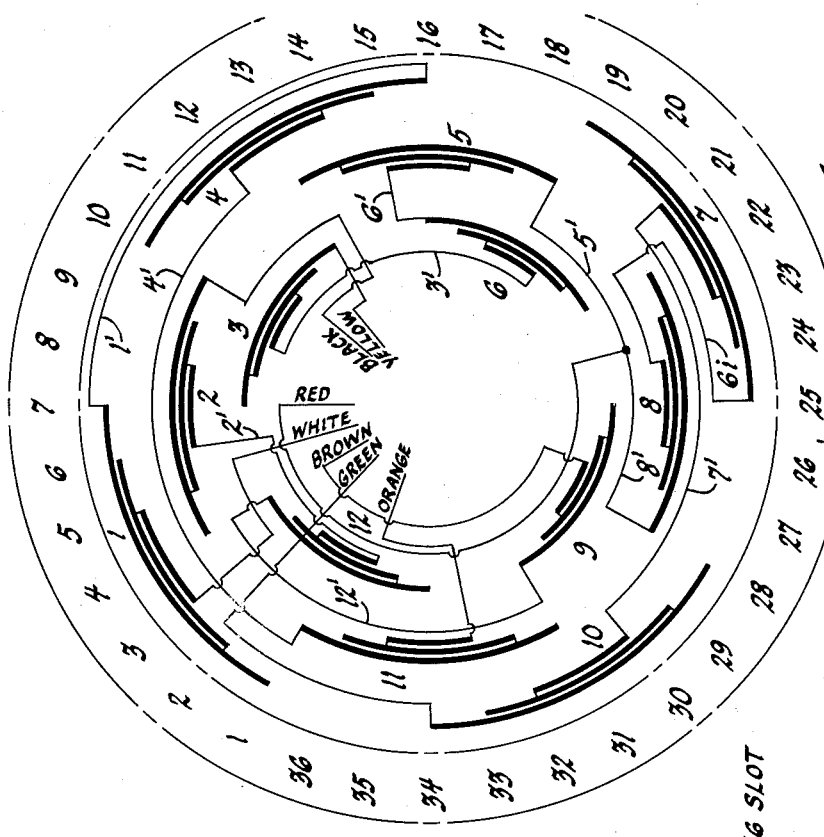
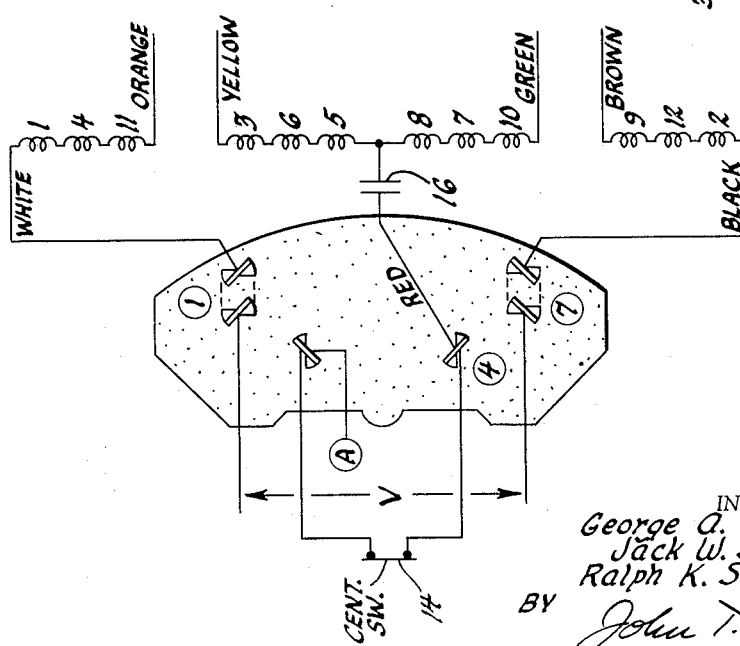

June 20, 1961 G. A. NEYHOUSE ET AL 2,989,654
MULTI-SPEED DYNAMOELECTRIC MACHINE
Filed April 6, 1959 10 Sheets-Sheet 7

INVENTORS
George A. Neyhouse
Jack W. Savage
Ralph K. Shewmon
BY
John T. Marvin
THEIR ATTORNEY

32 SLOT
FOUR/SIX POLE
CAPACITOR START

INVENTORS
George A. Neyhouse
Jack W. Savage
Ralph K. Shewmon
BY
John T. Marvin
THEIR ATTORNEY

30 SLOT
FOUR/SIX POLE
CAPACITOR START

INVENTORS
George A. Neyhouse
Jack W. Savage
Ralph K. Shewmon
BY John T. Marvin
THEIR ATTORNEY United States Patent Office 2,989,654
Patented June 20, 1961

1

2,989,654
MULTI-SPEED DYNAMOELECTRIC MACHINE
George A. Neyhouse and Jack W. Savage, Dayton, and Ralph K. Shewmon, Centerville, Ohio, assignors to General Motors Corporation, Detroit, Mich., a corporation of Delaware
Filed Apr. 6, 1959, Ser. No. 804,374
12 Claims. (Cl. 310—204)

This invention relates to multi-speed dynamoelectric machines and particularly to a motor having a "poleless" winding provided relative to a stator lamination assembly.

An object of this invention is to provide a new and improved motor having only one winding electrically connectable to obtain differing numbers of poles.

Another object of this invention is to provide a laminated stator assembly of a multi-speed motor having only one winding comprising multiple elements of which all copper is used at all times and relative to which no extra auxiliary or main winding is ever added.

Another object of this invention is to provide a single phase multi-speed A.C. motor having a single winding of a number of "poleless" elements filled into a number of lamination slots not necessarily evenly divisible by the number of elements yet adapted to be filled with conductors forming the elements such that only a predetermined number of tap leads or external connections are required to establish differing numbers of electrical poles resulting from flow of current in opposing directions in predetermined areas of mechanical contact of ends of elements between which voltage never exceeds line voltage.

Another object of this invention is to provide a constant pitch or constant throw winding for a "poleless" motor which in effect can be connected and adapted to form a predetermined number of electrical poles without having any specific mechanical or physical poles defined thereby.

A further object of this invention is to provide a "poleless" or constant-pitch multiple-coil-element single-winding motor in which electrical rather than mechanical or physical poles result from a summation or integration of total elemental coil flux as produced from the elemental coil currents.

Another object of this invention is to provide a multi-speed motor having multiple constant-pitch elements of a single winding that can be electrically connected to form four and six poles distributed relative to various numbers of lamination slots such as 24, 28, 30, 32, and/or 36 even though the number of elements is not evenly divisible relative to the number of slots.

Further objects and advantages of the present invention will be apparent from the following description, reference being had to the accompanying drawings wherein preferred embodiments of the present invention are clearly shown.

In the drawings:

FIGURE 1a is a chart illustrating a winding distribution relative to a stator for a dynamoelectric machine in accordance with the present invention.

FIGURE 1b is another chart to illustrate physical relationship of elements of a winding for a stator as outlined by FIGURES 1 and 1a.

FIGURE 1d is a graph that illustrates maximum voltages between elements of a winding provided relative to a stator in accordance with the present invention.

2

FIGURE 2 is a plan view of a stator and coil assembly in accordance with the present invention.

FIGURE 2a is a fragmentary elevational view of the assembly of FIGURE 2.

FIGURE 2b is a diagrammatic representation of a winding arrangement for the assembly of FIGURE 2.

FIGURE 2c is a schematic wiring diagram for a winding of a 36 slot stator as illustrated by FIGURE 2.

Figure 3:
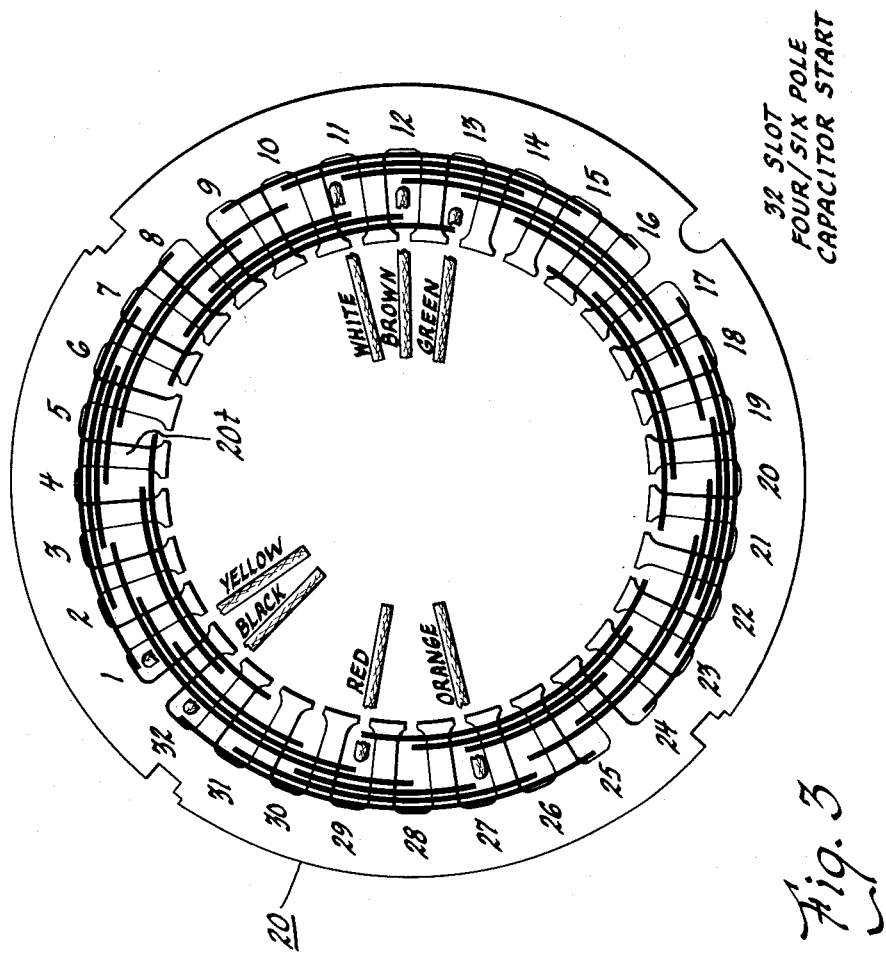

FIGURE 3 is a plan view of a stator and coil assembly of another embodiment of the present invention.

Figure 3A:
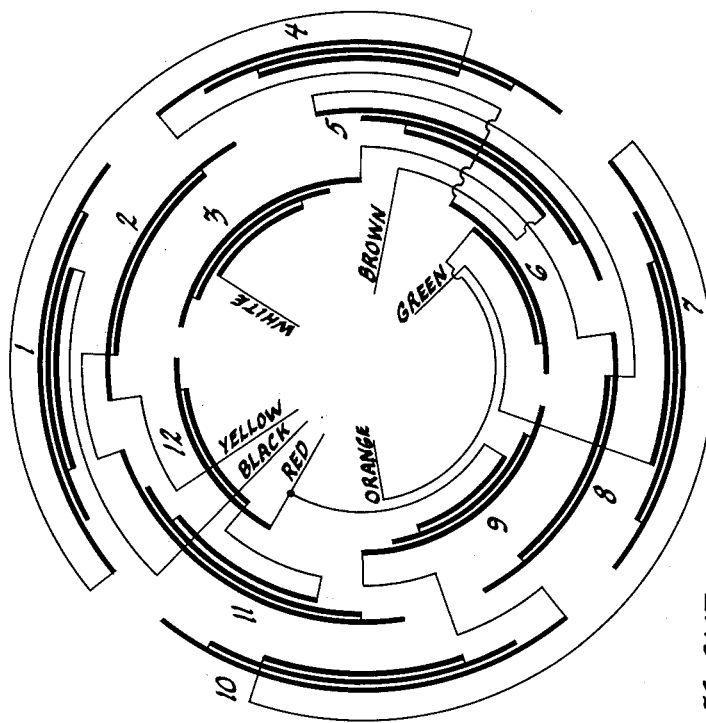

FIGURE 3a is a diagrammatic representation of a winding of a 32 slot stator as illustrated by FIGURE 3.

Figure 3B:
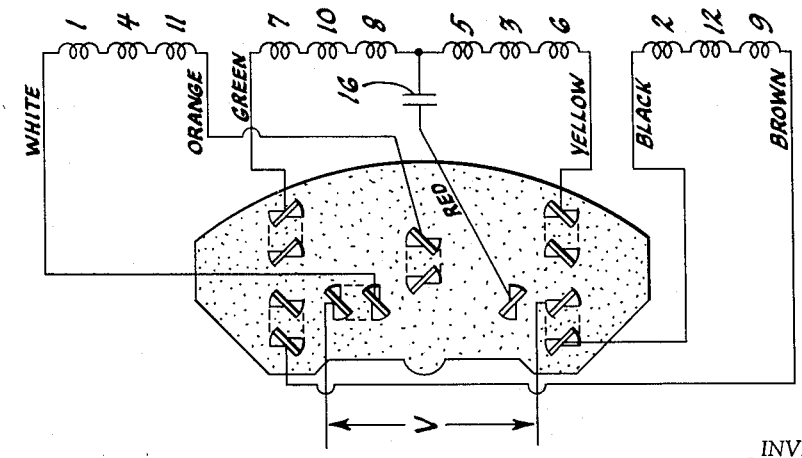

FIGURE 3b is a modified schematic wiring diagram for a stator winding in accordance with the present invention.

Figure 4:
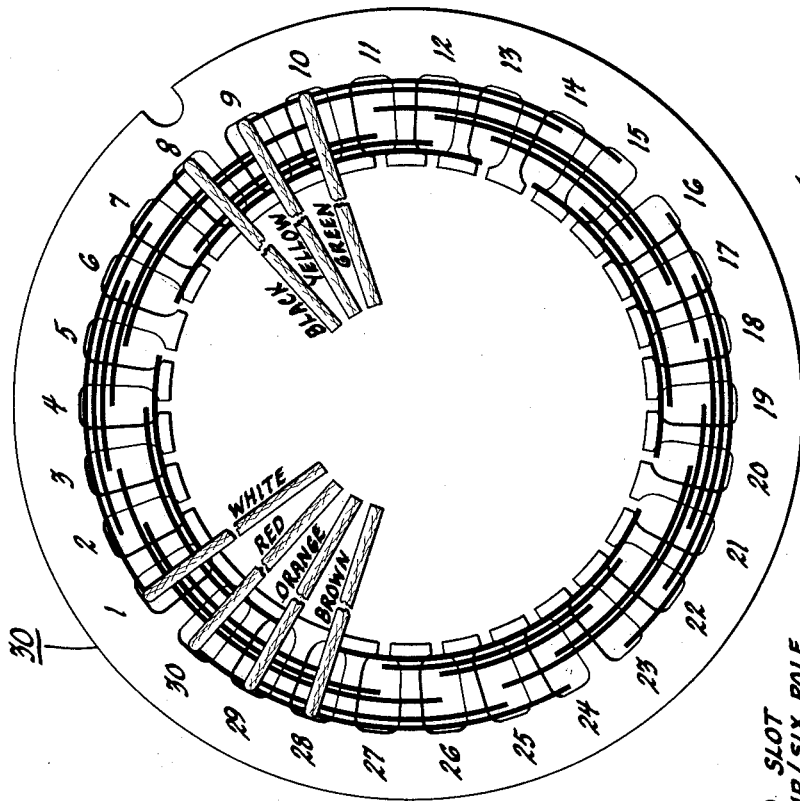

FIGURE 4 is a plan view of a stator and coil assembly of another embodiment of the present invention.

Figure 4A:
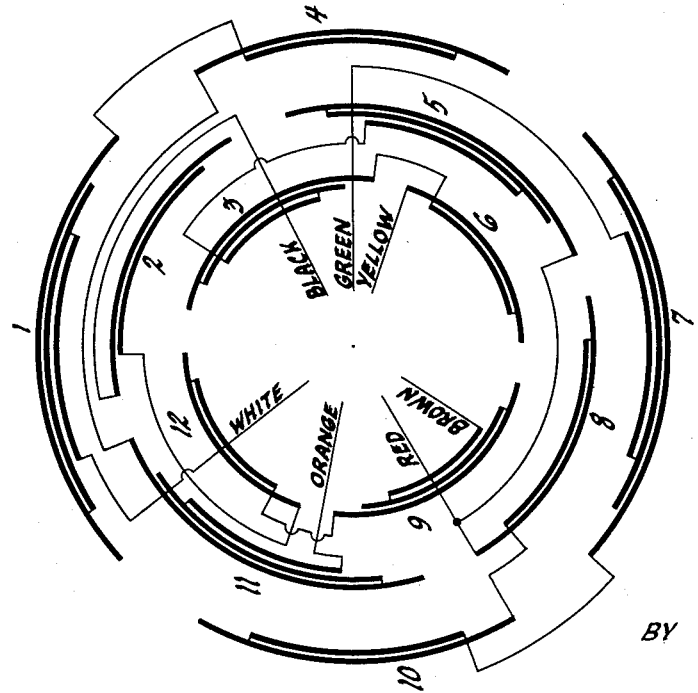

FIGURE 4a is a diagrammatic representation of a winding of a 30 slot stator as illustrated by FIGURE 4.

Figure 5:
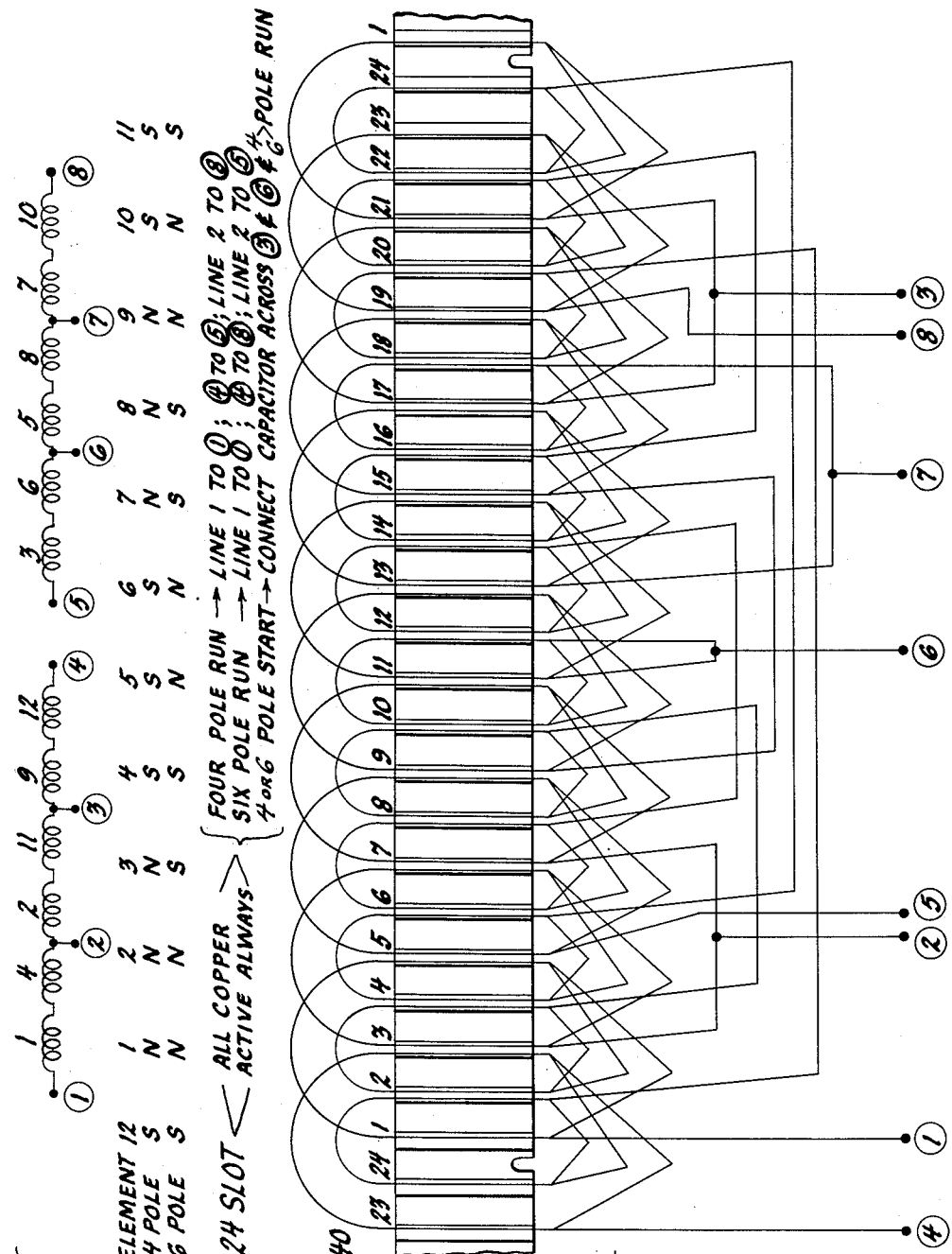

FIGURE 5 is a developed view of a circuit including a winding provided relative to a series of 24 slots of a stator for a dynamoelectric machine in accordance with the present invention.

A dynamoelectric machine in accordance with the present invention uses only a single winding composed of multiple elements or portions adapted to be connected and used for establishing multi-speed forward and reverse operation. This single winding includes a number of identical or substantially identical elements provided relative to a stator having a predetermined number of slots. The elements comprise only one winding from which predetermined numbers of electrical poles can be formed as desired by establishing wiring connections relative to the multiple elements of the single winding as will be described in further detail below. Use of only a single winding completely eliminates multiple sets of separate windings previously known to be used in motors including separate primary or running windings and separate auxiliary or starting windings. There is only one multiple element winding even though the subject motor can be used as a multiple speed motor without first and second primary or running windings and/or without first and second auxiliary or starting windings. Never is there any extra starting or phase winding or running winding used in addition to the single winding composed of multiple coil elements provided relative to a stator in a manner so that no complete, single, physical or mechanical poles can be identified relative to the stator. Various electrical connections can be established whereby energization of the elements and flow of current therein results in a determination of electrical poles relative to a stator lamination assembly having a predetermined number of slots extending radially thereof. Relative starting and running connections are to be set forth with respect to a four and six pole dynamoelectric machine in which all conducting material or copper of all elements of the single "poleless," multiple element winding is active and energized at all times.

Figure 1:
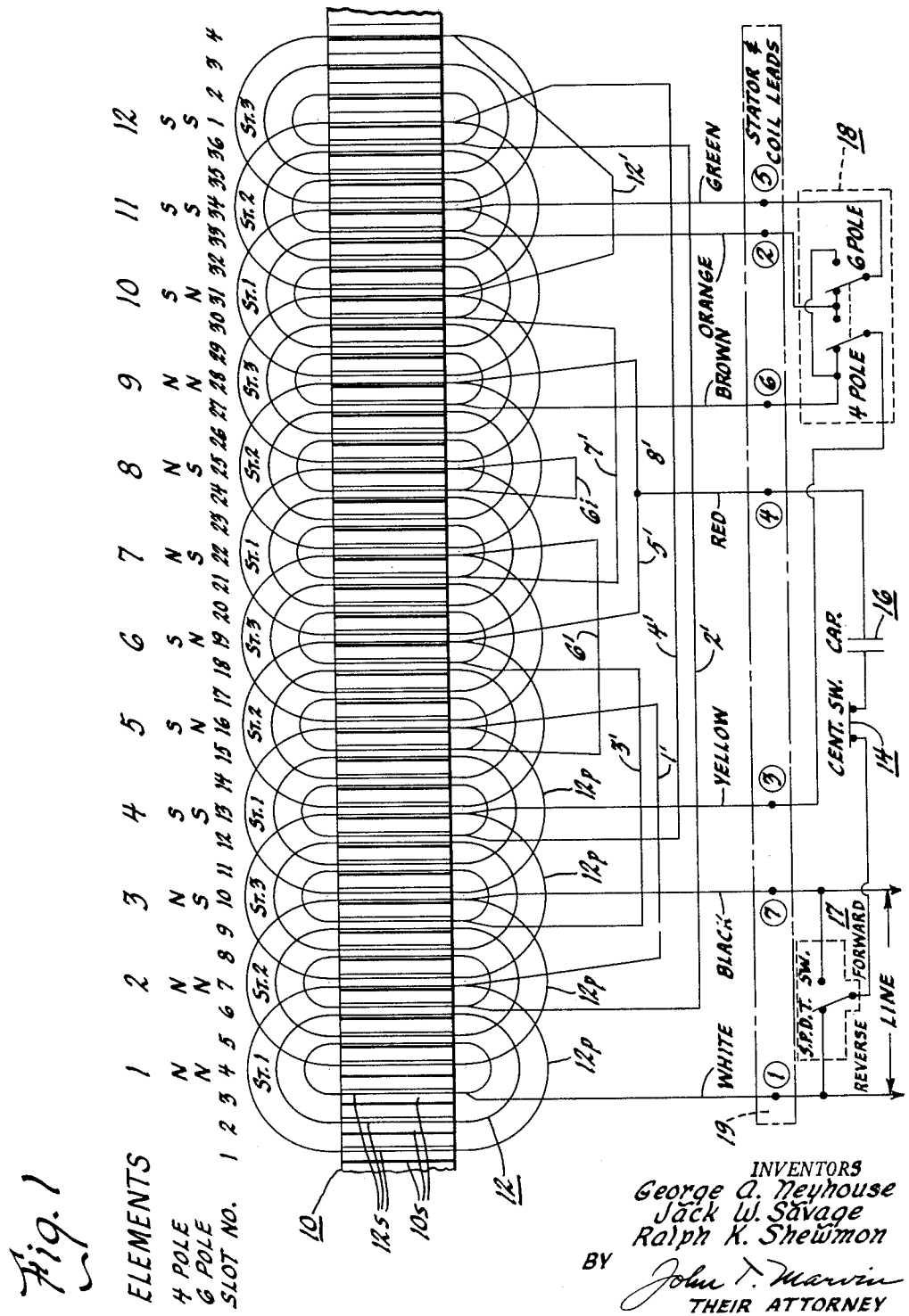
FIGURE 1 is a developed view of a circuit including a winding provided relative to a series of 36 slots of a stator for a dynamoelectric machine in accordance with the present invention.

In FIGURE 1 there is shown a developed view of a stator lamination assembly indicated generally by numeral 10 and having a single "poleless" winding generally indicated by numeral 12. The one winding includes a plurality of individual elements or portions 12p for each of which the conducting material is fitted to the slot so as to have a constant elemental span or throw. For the embodiment of FIGURE 1 there are 36 slots and a total of 12 elements of one winding from which predetermined numbers of electrical poles can be formed as desired by establishing wiring connections relative to coil elements. Physically each slot shown in the developed view of the stator 10 can be represented by a reference numeral 10s. Opposite longitudinal sides 12s of concentric sections of each element are placed in slots 10s. For example, for element number 1, opposite longitudinal sides of an external section are located in slots 1 and 7. Opposite longitudinal sides of an intermediate section are placed in slots 2 and 6, and opposite longitudinal sides of an inner or internal section of element 1 are placed in slots 3 and 5. Opposite sides of external section of element 2 are placed in slots 4 and 10. Similarly opposite sides of external section of elements 3 are placed in slots 7 and 13. Opposite sides of element number 4 are placed in slots 10 and 16. Thus, coil throw in the embodiment of FIGURE 1 covers a span between slots 1 and 7 for element 1, for example. There are three stages or locations in depth relative to the slots in which the constant pitch or "poleless" winding elements are distributed. These stages can be best seen in a chart in FIGURE 1a.

Figures 1A, 1B:
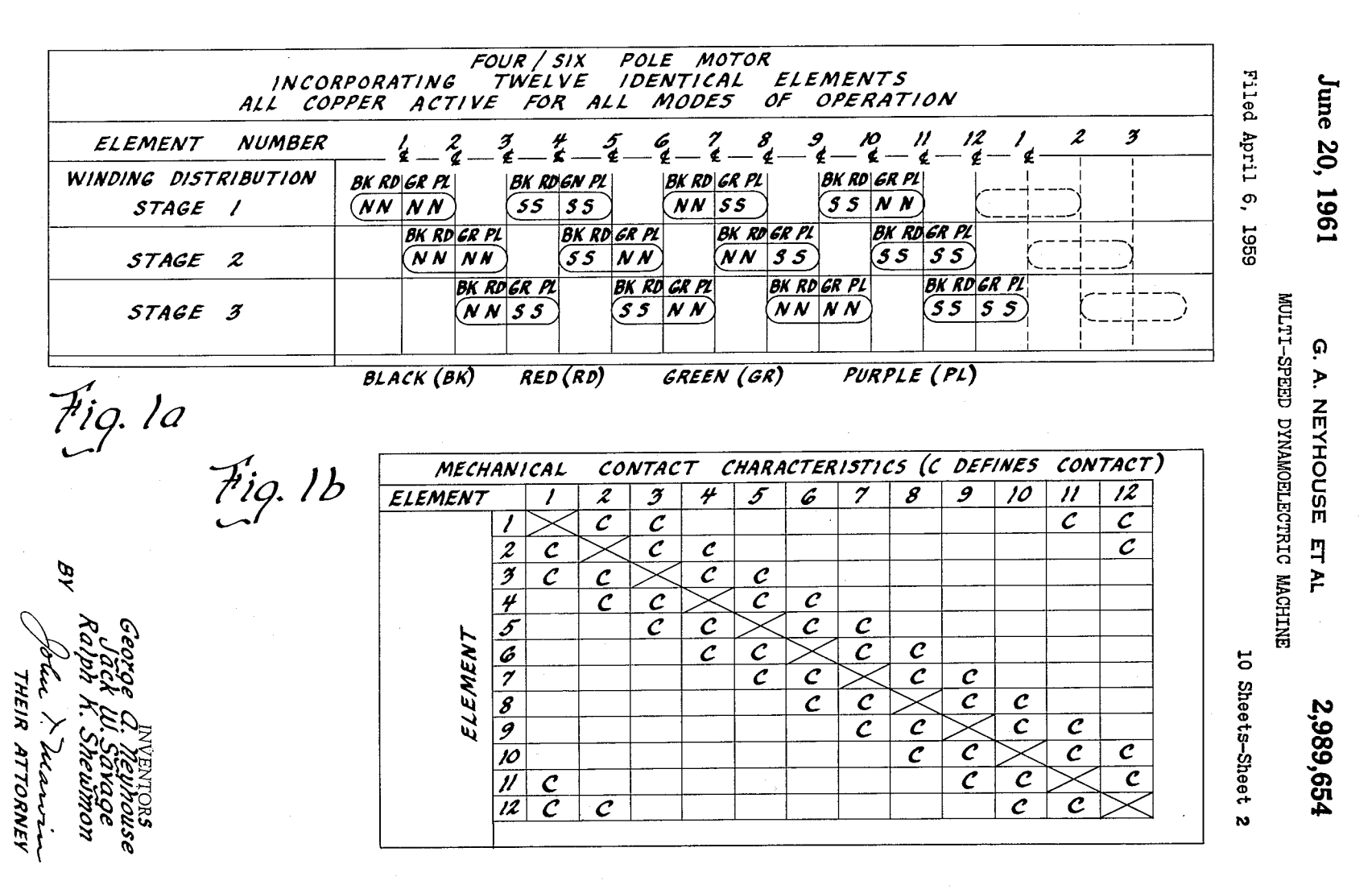

The chart of FIGURE 1a is titled "4/6 Pole Motor Incorporating Twelve Identical Elements, All Copper Active for all Modes of Operation" and along the top of the chart there is a designation of the element numbers 1 through 12 involved. Extending downwardly from each element number in the chart of FIGURE 1a are slot center lines that coincide centrally relative to element numbers 1–12. Each winding element is represented in FIGURE 1a by an elongated elliptical winding path inside of which are letters "n" and "s" that serve to identify polarity of the particular winding elements under various modes of operation as established by wiring connections to be described in further detail. A color code is established in the chart of FIGURE 1a relative to each of the letters "n" and "s" representing these various polarities for each element in each operating condition. The color code includes reference to black (BK), red (RD), green (GR), purple (PL). Abbreviations of these color designations including BK, RD, GR and PL are used in the chart and are placed externally relative to the outline of each elongated elliptical winding path for each element. A letter "n" or "s" immediately below this abbreviated color designation relative to the several stages of elliptical winding paths can be taken with reference to illustrations of FIGURES 1c and 1d that disclose further features and characteristics of a dynamoelectric machine having a "poleless" winding in accordance with the present invention. However, prior to describing these features and characteristics electrically relative to the dynamoelectric machine of the present invention, reference is made to physical and mechanical relationships and characteristics apparent in illustrations of FIGURES 1, 1a and 1b.

Physical relationship of the elements or portions 12p of the one winding 12 can be further understood by referring to a chart of FIGURE 1b bearing a heading "Mechanical Contact Characteristics" and including vertical and longitudinal reference to element numbers. In the chart of FIGURE 1b a letter "C" defines physical or mechanical contact between various identical elements of the sole winding. Selecting element number 7 for purposes of illustration, it is noted that there is physical contact or at least a close physical relationship in adjacent slots of the stator lamination assembly 10 between element number 7 and elements numbers 5, 6, 8 and 9. By referring to the winding distribution portion of the disclosure for this embodiment as represented in the chart of FIGURE 1a, it is clear that element number 7 will have some physical contact with elements 5, 6, 8 and 9. The chart of FIGURE 1a outlines winding distribution showing twelve identical elements and a continuation of this chart is provided to represent the fact that the elements of this single winding are provided along an inner annular periphery of a stator lamination assembly in a continuous pattern and this continuous pattern as indicated by dotted lines in an elliptical path referring to elements 1, 2 and 3 must be taken to illustrate the fact that visual inspection of elements 1 through 12 will not result in identification of any one element of the single winding relative to any particular pole physically relative to the stator lamination assembly. In fact the numbering of elements 1 through 12 in this disclosure represents an arbitrary choice for purposes of description. It is apparent that visual inspection of the elements of the single winding reveals only a "poleless" winding having multiple elements each of which has physical or mechanical contact or relationship with at least four other completely identical elements. It is to be understood that each of the elements and the four additional identical elements with which there is physical or mechanical contact for use in accordance with the present invention is fully energized and active at all times during modes of operation represented by various operating connections illustrated in FIGURE 1c.

Figure 1C:
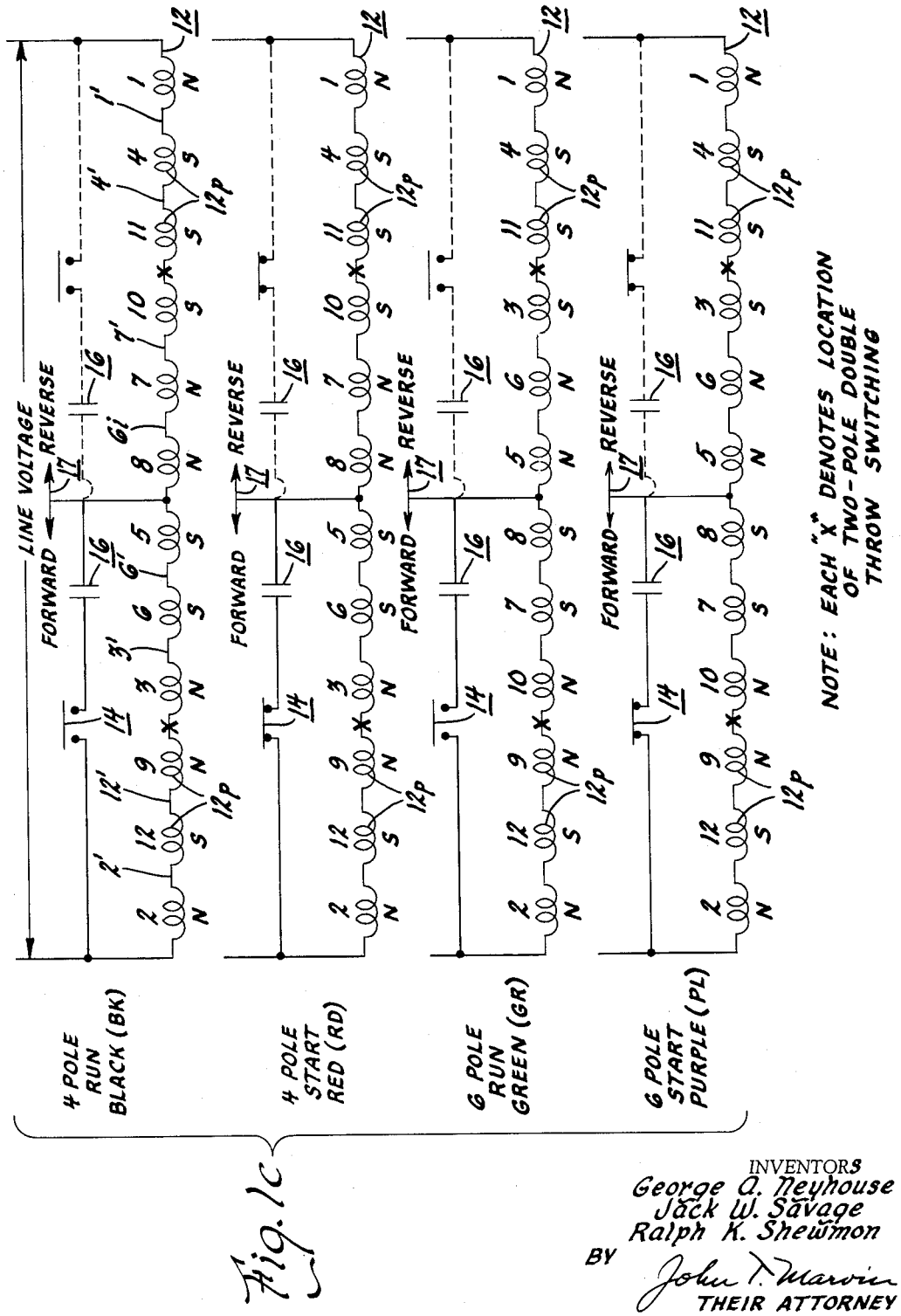
FIGURE 1c is a schematic representation of various operating connections possible in a dynamoelectric machine in accordance with the present invention.

Operating connections represented in FIGURE 1c are four pole run, black (BK); four pole start, red (RD); six pole run, green (GR); and six pole start, purple (PL). It is to be understood that both four and six pole run and both four and six pole starting can be attained using a single winding having elements 1 through 12 in accordance with the present invention. The elements are connected in series with each other in differing relationships established by using free ends of particular coils and tap off connections illustrated in FIGURE 1 which also shows a circuit including centrifugal switching means generally indicated by numeral 14, a phase shifting means such as a resistance or capacitor generally indicated by numeral 16 and also including a single-pole double-throw switch generally indicated by numeral 17 and double-pole double-throw switch generally indicated by numeral 18. In the illustration of FIGURE 1c each "X" denotes location of a connection established by the two-pole double-throw switch 18. Also in the illustration of FIGURE 1c, the solid lines representing lead wires interconnecting the centrifugal switch 14 and capacitor 16 relative to various elements and at least one side of the line leads are shown both as solid lines and as dotted lines. It is to be understood that only one such connection is established at one time and the solid lines diagrammatically represent forward operation and the dotted lines diagrammatically represent reverse operations as established by positioning of the single-pole double-throw switch 17 of FIG. 1. Oppositely extending arrows representing forward and reverse operation are identified with reference numeral 17 for purposes of clarity to identify and correlate these arrows with the single-pole double-throw switch 17 in the circuit of FIGURE 1. It is apparent that identical elements 1 through 12 in the layout of FIGURE 1 must be connected in series relative to each in a numerical relationship arbitrarily selected beginning as element 1 and being connected in a progression 2–12–9–3–6–5–8–7–10–11–4–1 for four pole running operation. The polarity of these elements in this particular four-pole run progression is 2–n, 12–s, 9–n, 3–n, 6–s, 5–s, 8–n, 7–n, 10–s, 11–s, 4–s, and 1–n respectively. These polarities in this particular relationship for four-pole run operation are designated by a color code (BK) for black and in referring to the chart of FIGURE 1a, it is apparent that for four-pole run operation corresponding polarities for these respective elements of the single winding in the three stages is represented by letters "n" and "s" adjacent to the letters or abbreviation (BK) for black in the color code. The progressive relationship of the coil elements and their polarities for four-pole starting can be seen to be the same as for four-pole running. The only difference in four-pole starting exists in the closing of the centrifugal switch 14 which is open for four-pole run and which includes the capacitance 16 or a resistance (not shown) for phase shifting purposes in parallel relative to substantially one-half of the copper or metal of conductor material in the elements of the single winding.

For six-pole running operation the progression of element numbers and polarities is 2–n, 12–s, 9–n, 10–n, 7–s, 8–s, 5–n, 6–n, 3–s, 11–s, 4–s, 1–n, wherein the letters "n" and "s" indicate north and south element polarity to form complete electrical poles established by electrical wiring connections in accordance with the circuit of FIGURE 1. For six-pole starting operation, the centrifugal switch 14 is again closed so as to connect a phase shifting means such as capacitor 16 into parallel relation relative to a portion of the elements of the single winding. The color codes for four-pole starting, six-pole running, and six-pole starting are red, green and purple, respectively, and therefore, appropriate abbreviations of these colors are indicated adjacent to letters "n" and "s" in the chart of FIGURE 1a. It is to be understood that when any one of the elements 1 through 12 represented in the chart of FIGURE 1a is connected for north or sourth polarity, the concentric relationship of external intermediate and internal sections of each element are such that flux strength or magneto-motive force of this polarity for each particular element is concentrated along the center line of the particular element as represented in FIGURE 1a. The strength of this flux force diminishes on either side of this center line to a predetermined extent but it is to be understood that an integration of flux forces of at least four elements of the single winding occurs due to the physical or mechanical contact characteristics outlined by the chart of FIGURE 1b and therefore electrical poles are established representing a resultant force obtained from summation of these individual coil element flux forces. Near the top of FIGURE 1 there is a designation by letters "n" and "s" as to the polarity of a particular element under either four or six pole operation.

The chart of FIGURE 1a is specifically related to the circuit and winding layout of FIGURE 1 for a stator provided with 36 radially inwardly-extending slots. The twelve identical elements are distributed in 36 slots and result in a symmetrical configuration or placement of the elements relative to the slotted stator assembly. As arbitrarily identified for purposes of clarity, an element of a first stage is placed into slots 1 and 7 and a subsequent element is placed in slots 4 and 10. Thus a second stage begins with identical elements being placed in stator slots located 30° from the beginning of the first element of the first stage. The progress of placing ends of winding elements of constant pitch into slots continues having an arc representing a span equivalent to that of the span between the first and seventh slots for each of the elements. It is to be understood that the elements are wound relative to the slots so that in effect a staggered relationship is attained as represented by the winding distribution illustrated by the chart of FIGURE 1a but such that actually the elements of the stages 1, 2 and 3 are firmly pressed and engaged in tight relationship to each other into the slots along an inner periphery of a stator lamination assembly. In effect the elements 12p are in double overlapping engagement to each other as evidenced by the chart of FIGURE 1a. Coil 11, for example, is in direct engagement with one side of coil or element 10 and also with one side of coil or element 12. In addition element 11 has physical contact with a lateral end of one side of element 9 as well as element 1. Thus, physical or mechanical contact exists between element 11 and four other elements.

In FIGURE 1 stages 1, 2 and 3 of the elements are identified by letters "St. 1," "St. 2," "St. 3," respectively, as marked in the upper end loop portions of the view. Thus, elements 1, 4, 7 and 10 belong to stage 1, elements 2, 5, 8 and 11 belong to stage 2 and elements 3, 6, 9 and 12 belong to stage 3. Each element as wound in the arrangement shown by FIGURE 1 includes conducting material fitted to have predetermined span or throw relative to a slotted stator and which cannot be termed a concentric winding because wire appears and is placed in slots 1–7 and 2–6 and 3–5 for element 1, for example, in a substantially concentric relationship only to each other. The remaining elements of stage 1 are in no way concentric to other elements of stage 1. Thus, there are no poles physically identifiable specifically with any particular element as the elements are placed in the 36 slots as mentioned above. Since no physical or mechanical poles are provided and since there is in effect only one multiple element winding comprising many portions or elements, relative to which predetermined connections can be established between various elements to effect selection of electrical pole relationship due to directions of current flow through the windings and also due to phase relationship of currents flowing through various portions or elements of the winding. Sequence of connection of elements is clearly shown in FIGURE 1c and a lower portion of an illustration of FIGURE 1 provides the circuit connections involved for establishing these relationships. For each condition of operation or relationship, namely, four-pole run, four-pole start, six-pole run, six-pole start, there is only one winding including a plurality of elements not identified as separate running windings or separate auxiliary or starting windings. For starting purposes a portion of this one winding is selected to serve a function as a starting winding when a circuit is completed by a single pole double-throw switch 17 referred to earlier. This switch 17 effects closure of an electrical line through a centrifugal switch and phase shifting means such as the capacitor 16. A terminal block 19 for establishing connections between stator and coil leads relative to the circuit is shown to include locations of terminals identified by numerals in circles including 1, 7, 3, 4, 6, 2 and 5. The capacitor 16 has a lead connected at one end to the terminal of the terminal block at a location number 4 in a circle which in turn is connected by a lead identified as "red" to tap-in leads 5' and 8' representing connections to ends of elements 5 and 8 respectively. These ends of elements 5 and 8 are located in slots 19 and 28, respectively. The end of element 1 is connected by a lead 1' to an end of element 4, an opposite end of element 4, that is with the internal sector of element 4, is connected by a lead 4' with an outer end of element 11. Further internal connections are established by a lead 2' that interconnects internal sectors of elements 2 and 12. Also an internal connection is established by a lead 12' between an external sector of element 12 and an external sector of element 9. An internal sector of element 5 is connected by a lead 6' relative to external sector of element 6. Lead 3' interconnects internal sector of element 3 and internal sector of element 6. Lead 7' provides internal connection between inner sector of element 7 and the inner sector of element 10. Also, a lead 6i interconnects the external sector of element 7 and internal sector of element 8. For purposes of clarity these lead connections establishing circuit continuity represented in FIGURE 1c and FIGURE 1 are applied in both of the illustrations of these figures. A line voltage connection is provided relative to locations 1 and 7 of terminals on the terminal block 19 of the motor and a "white" indicated lead from an internal sector of element 1 is connected to a terminal at location 1 and a lead indicated as "black" connected in external sector of element 2 with the terminal at location number 7. Depending upon the manual positioning of the single-pole double-throw switch 17, a clockwise or counter-clockwise rotation can be effected by application of line voltage. The "red" tap lead permits parallel connection of capacitor 16 in series with centrifugal switch 14 from the winding mid-point relative to either terminal locations 1 or 7 of the terminal block 19. If the single-pole double-throw switch 17 is thrown to the right, not shown in FIGURE 1, and the double-pole double-throw switch is set for four poles, an electrical connection is established whereby the centrifugal switch in series with the capacitance 16 is connected in parallel across elements 5, 6, 3, 9, 12 and 2. Conversely, if the single-pole double-throw switch is thrown to the left a connection is made whereby the capacitance and centrifugal switch in series are connected in parallel across elements 8, 7, 10, 11, 4 and 1. Once a predetermined speed is attained, the centrifugal switch opens the circuit through the capacitance deenergizing the capacitor and eliminating phase shift of currents in respective pole portions or elements thereby creating a normal four-pole run type motor characteristic and the single constant pitch winding remains connected with elements resulting in polarities represented by letters "n" and "s" indicated in one portion of FIGURE 1 and also marked in various locations in FIGURE 1c as well as in the chart of FIGURE 1a.

With the specific winding arrangement of FIGURE 1 for a single phase, four-six pole reversible motor, there is provided a "poleless" or constant-pitch multiple coil-element single-winding motor in which electrical rather than mechanical or physical poles result from a summation or integration of total flux from coil element currents as influenced by summation of flux force in the same or opposing directions due to directions of current flow in elements. A cancellation of flux forces occurs where and if current is in opposing directions. The physical or mechanical contact of elements relative to each other as well as the double overlapping relation thereof to certain adjacent elements is such that voltage between adjacent sides or elements never exceeds line voltage.

A chart of FIGURE 1d indicates graphically measurements taken of maximum voltages between elements of a winding provided relative to a stator in accordance with the present invention for a four-six pole single phase motor. The color code black, red, green and purple as referred to for operating conditions identified in FIGURES 1c and 1a are indicated near the bottom of each column representing four and six pole operation under characteristics of "R" running, and "S" starting. The measurements of maximum contact voltage characteristics represented in the graph of FIGURE 1d were taken using a line voltage of 120 volts. Line voltage is applied to leads between elements 1 and 2 and entries are made for values of voltage corresponding to entries in the chart of FIGURE 1b wherein mechanical contact characteristics of elements relative to each other are outlined. Thus a voltage reading was taken between each of the elements where mechanical or physical contact occurs. It is particularly noteworthy that at no time does contact voltage between elements having mechanical or physical contact with each other exceed line voltage. For example, element number 5 has physical contact with element number 4 and the following contact voltages are represented in the graph of FIGURE 1d. During four pole running the element number 4 has a contact voltage of 60 volts relative to element number 5. During four pole starting the element number 4 has a physical contact voltage of 68 volts relative to element number 5. During six pole running and starting the contact voltage characteristics between elements 4 and 5 are 50 and 60 volts, respectively. This feature of never having contact voltage exceed the line voltage in a single winding arrangement in accordance with the present invention is particularly valuable in that the existence of "hot spots" where insulation failure or burning can occur is reduced. Also shorting between elements is substantially reduced. Since the elements of the single constant pitch winding are so placed in relationship to each other that there is never a voltage between the coils exceeding line voltage, it is more economical to build and insulate a multispeed motor utilizing all copper which is energized and active at all times.

It should be noted that a constant pitch or constant throw winding is physically different than concentric windings because concentric windings are formed in specific coils concentrically located relative to each other so as to define in effect a definite or mechanical pole. A constant pitch or constant throw winding for a "poleless" motor in effect can be adapted to form a predetermined number of electrical poles without having any specific mechanical or physical poles defined thereby. In the "poleless" winding motor, an electrical pole results from a summation or integration of total flux from element currents as represented in the graph of FIGURE 1d. An overall sum of this flux will result in formation of electrical resultant poles. Since any one pole constitutes a given number of individual adjacently wound coil elements within a predetermined area in which an electrical resultant pole is formed, there is necessarily a bucking of currents in overlapped areas of adjacent mechanically contacting coil elements. A part of the area of such a resultant pole in which such bucking occurs will lie where poles or pole areas are separated from each other. For example, for a four pole connection, elements 1, 2 and 3 will have a north polarity which is obtained as an electrical summation effected by element 1 and also effected by elements 2, 3, 4 and 12. Elements 4 and 12 have a south polarity which in part bucks a north polarity of coils 3 and 1 respectively, while elements 1, 2 and 3 all have a north polarity. The center line of element 2 is in effect an electric center of one of the four poles because elements 4, 5 and 6 have an opposite (south) polarity centered with element 5. An area of bucking occurs as to element 4 from element 3 which has a north polarity and similarly bucking occurs as to element 6 from element 7 which also has a north polarity and thereby forms bucking parts between poles whereby pole areas are defined or separated. This separation of pole area occurs with all copper active at all times and in effect some of this copper is thus non-productive so far as torque of the motor is concerned. This can be referred to as a "drone" relationship but there is an advantage in even this "drone" relationship in that electrical poles are more positively defined and separated relative to each other. There is less bucking of element 3 relative to element 5 than relative to element 4 because element 4 is actually overlapping part of element 3 and is only adjacent to element 5. In all instances all copper of all elements of the single winding is active at all times and serves a useful purpose. Alternate functions for elements 3, 5, 6, 7, 8 and 10 can be visualized in FIGURE 1 where letters "n" and "s" indicate difference in polarity of these particular elements during four pole or six pole operation.

Connecting means such as leads 3', 7', 8', etc. as well as one single-pole double-throw switch and one double-pole double-throw switch shown in the circuit of FIGURE 1 can be used for establishing four and six pole connections and for effecting forward and reverse operation utilizing only multiple elements of a "poleless" or single constant-pitch winding.

FIGURE 2 is a plan view of a stator and coil assembly in accordance with the present invention. Colors of leads coinciding with those shown in circuit of FIGURE 1 are shown as marked in FIGURE 2. The symmetrical physical relationship of the coil elements 12p of the single winding 12 placed relative to slots 10s can be observed in FIGURE 2. Also the leads totalling no more than seven in number for the 36 slot, four pole-six pole machine can be seen in FIGURE 2a which is a fragmentary elevational view of the assembly of FIGURE 2 showing the single winding 12 and the stator lamination assembly 10. For purposes of clarity, the slots 10s have numbers 1 through 36 identified immediately adjacent to each slot at a location radially outwardly thereof. Elements 1 through 12 are identified by numerals enclosed in circles and it is apparent that elements 1, 4, 7 and 10 identified as being in stage 1 in the chart of FIGURE 1a are located with external sections having a span between slots 1-7, 10-16, 19-25, and 28-34, respectively, and is also indicated in the illustration of FIGURE 1. Other elements are located relative to slots and stages corresponding with indications of FIGURES 1 and 1a.

A diagrammatic representation of a winding arrangement for the assembly of FIGURE 2 is provided in FIGURE 2b. The leads identified by colors marked as red, white, black, brown, green, orange and yellow as referred to in FIGURES 1, 2 and 2a are also shown on FIGURE 2b together with the internal lead connections as described with the circuit of FIGURE 1.

FIGURE 2c is a schematic wiring diagram for the motor as described thus far. The components shown in FIGURE 2c are those referred to in the description of FIGURE 1c. Double-pole double-throw switch 18 and single-pole double-throw switch 17 are connected in the circuit of FIGURE 1 relative to terminals 1, 4 and 7 to which leads colored white, red and black, respectively, are shown connected in FIGURE 1. For four-pole operation at approximately 1725 r.p.m., the black lead in FIGURE 2c is connected to terminal 7 and the white lead is connected to terminal 1. Line voltage represented by the letter V is applied across terminals 1 and 7. Further in the circuit of FIGURE 2c, for four-pole operation at 1725 r.p.m., the brown lead is connected to the yellow lead and the green lead is connected to the orange lead. For six-pole operation at approximately 1140 r.p.m. with reference to the illustration of FIGURE 2c, the black and white leads are connected to line and the brown lead is connected to the green lead while the yellow lead is connected to the orange lead. For clockwise rotation, the end of lead identified by a capital "A" in a circle is connected to the terminal 7 having the black lead connected thereto. For counterclockwise rotation, the lead end of the lead identified by letter "A" in a circle is connected to terminal 1 to which the white lead is connected. Elements 1 through 12 and the capacitor 16 are in the illustration of FIGURE 2c.

Connections just described relative to the schematic wiring diagram of FIGURE 2c can also be applied relative to a winding arrangement for a stator and coil assembly having 32 slots and shown in FIGURE 3. A stator generally indicated by numeral 20 in FIGURE 3 is provided with elements 1 through 12 which are fitted into slots 1 through 32 in FIGURE 3. The span of the external sector of element 1 extends between slots 1 and 8 while the span of the intermediate sector extends between slots 2 and 7 and the inner sector has a span extending between slots 3 and 6. The center line for electromagnetic force or flux for an electrical pole if determined solely by an element 1 will be located along the center line of a tooth 20T between slots 4 and 5. This center line along the tooth 20T differs from the location of a center line for such an electrical pole taken for example for element 1 of FIGURE 2 wherein the location of the center line would be coincident with the center line of slot 4. A diagrammatic representation of the single winding for a 32-slot stator in which all copper is active at all times is provided in FIGURE 3a in which it is readily apparent that the general layout of the elements 1 through 12 is substantially identical with the layout of elements 1 through 12 as represented in the diagrammatic representation of a winding arrangement for the 36-slot stator as shown by FIGURE 2b. Element number 4 for the 32-slot embodiment has a span covering slots 9–16, 10–15, and 11–14, while elements 7 and 10 have comparable positions relative to the remaining 32 slots.

The schematic wiring diagram of FIGURE 2c represents connections that can be established for the single winding placed relative to 32 slots of the stator 20. The connections can be readily traced in the diagrammatic representation of FIGURE 3a. It is to be understood that line voltage is to be applied across the white and black leads for the embodiment of FIGURE 3a and this particular application of line voltage is comparable to that illustrated by FIGURE 2c. However, it should be noted that for the 32-slot embodiment, four/six pole capacitor start motor in accordance with the present invention, there is a slight modification and difference from the connection of elements per se such that the black lead, as shown in FIGURE 3a, is connected with element 1, which in turn is connected in series with element 4 and the element 6 from which the orange lead extends. The white lead in the embodiment of FIGURE 3a is connected to element 3 which is in series with element 8 and element 5 from which the brown lead extends. The green lead is connected to element 7 which is in series with elements 10 and 9 from which a common connection is made to the red lead that is also connected with element 12 in series with elements 11 and 2 from which the yellow lead extends, as shown in FIGURE 3a. It is to be understood that a capacitor 16 is connected to the red lead and clockwise and counterclockwise operation for the 32-slot embodiment of the motor is attained similarly as was described with connections involving orange-yellow-green-brown leads as referred to with the description for FIGURE 2c. Appropriate north and south polarities are achieved by using the winding arrangement of FIGURE 3a similar to polarities described for the 36-slot embodiment. Basically, the chart of FIGURE 1a illustrates the winding distribution of elements and polarities for various operating connections relative to these elements are as indicated in figures of the drawings as previously described. The mechanical contact characteristics are substantially as shown in FIGURE 1 and it is to be understood that in accordance with the present invention, the single winding for the 32-slot embodiment is made up of mechanically "poleless" or multiple coil elements in which electrical rather than mechanical or physical poles result from a summation or integration of total flux of coil element currents. Voltage between contacting ends of elements for the 32-slot embodiment also never exceeds line voltage and the values set forth in the chart of FIGURE 1b are similar and indicative as to characteristics of the 32-slot embodiment of a dynamo-electric machine in accordance with the present invention.

FIGURE 3b illustrates a modified schematic wiring diagram for a stator winding in accordance with the present invention which can be adapted for use to connect elements 1 through 12 placed in predetermined slots relative to a 30-slot, four-six pole, capacitor start dynamoelectric machine having a stator generally indicated by numeral 30 in FIGURE 4. FIGURE 4a is a diagrammatic representation of a winding placed relative to the 30-slot stator of FIGURE 4 and it is apparent that the elements 1 through 12 are again placed relative to slots of the stator such that a "poleless," multiple coil element arrangement is obtained. In each of the embodiments described thus far, there is no way of establishing mechanical poles and only electrical connections can be used to establish electrical poles relative to a single winding in which all conducting material is active at all times. For the single winding having 12 elements provided relative to 30 slots as illustrated in FIGURES 4 and 4a, line voltage is applied relative to the black and white leads. Elements 1–4–11, 7–10–8, 5–3–6, and 9–12–2 are connected relative to each other as illustrated by the schematic wiring diagram for the 30-slot embodiment as illustrated in FIGURE 3b. For the wiring diagram as shown in FIGURE 3b, four-pole operation at approximately 1725 r.p.m. is obtained in the following manner. Line voltage is applied to the black and white leads for both four-pole and six-pole operation. However, for four-pole operation, a brown lead is connected to the yellow lead and the green lead is connected to the orange lead. For six-pole operation at substantially 1140 r.p.m., the brown lead is connected to the green lead and the yellow lead is connected to the orange lead. The capacitor is represented by numeral 16 and is added to the circuit as explained for the embodiment of the 36-slot stator described earlier.

FIGURE 5 is a developed view of a circuit including a winding provided relative to a series of 24 slots of a stator for a dynamoelectric machine in accordance with the present invention. Near the top of the view of FIGURE 5 there is shown a representation of polarities "n" and "s" for four and six-pole operation relative to 12 elements of a single winding in accordance with the present invention. It is to be noted that element 1 has a center line coinciding with the centerline of slot number 3 and element 6 has a center line coinciding with the centerline of slot 13. The designations as to polarity are provided beneath numbers identifying the elements and in the drawing these designations are aligned relative to the center lines of the individual elements with respect to the center lines of slots in an exploded view of a stator 40 having only 24 slots. Connections for four-pole run, six-pole run and four-pole start and six-pole start are indicated in the view of FIGURE 5 and it is to be understood that a phase shifting means such as a capacitor 16 or resistance is connected across the tap-in leads 3 and 6 (in circles) in conjunction with a connection for four-pole run and six-pole run for starting characteristics. Tap-in leads are provided for the single winding between elements 4–2, 11–9, 6–5, and 8–7. Switches such as the double pole, double-throw switch 18 referred to with reference to FIGURE 1 can be provided for effecting operation of a multi-speed motor in accordance with the present invention for the 24-slot stator embodiment of FIGURE 5 also. Voltages between ends of elements for the 24-slot embodiment also never exceed the line voltage applied relative to terminals 1 and 8 for four-pole running or terminals 1 and 5 for six-pole running. It is to be noted that for the embodiment of FIGURE 5, different four or six-pole starting characteristics can be obtained by connecting a phase shifting means such as a capacitor across tap-in leads at points 2 and 7.

It is to be understood that by providing a phase shifting means relative to different elements of the 32-slot and 30-slot embodiments of the winding, it is possible to attain different starting torques because there is no symmetry for a winding arrangement of 32-slot, 30-slot and 28-slot embodiments. However, for the 36-slot embodiment as well as for the other embodiments disclosed, there is symmetry so far as the elements of the single winding are concerned. For 32-slot, 30-slot and 28-slot embodiments, it is also possible to vary the number of turns for particular elements such that their individual strengths can be altered. Progression of elements respective polarities for 32-slot 4-pole operation is 1–n, 4–s, 6–n, 7–n, 10–s, 9–s, 12–n, 11–n, 2–s, 5–n, 8–s and 3–s and for six-pole operation is 1–n, 4–s, 6–n, 2–n, 11–s, 12–s, 9–n, 10–n, 7–s, 5–n, 8–s, and 3s. Progression of elements and respective polarities for 30-slot four-pole operation is 1–n, 4–s, 11–s, 7–n, 10–s, 8–n, 5–s, 3–n, 6–s, 9–n, 12–s and 2–n and for six-pole operation is 1–n, 4–s, 11–s, 7–s, 10–n, 8–s, 5–n, 3–s, 6–n, 9–n 12–s and 2–n. For 32-slot, 30-slot and 28-slot embodiments, the physical arrangement of the elements or coils is non-symmetrical relative to the slotted stator but basic circuit connections and switching arrangements are the same as described for the 36-slot embodiment. Thus, only 32-slot, 30-slot and 28-slot embodiments are unequally spaced so far as the fitting of elements is concerned relative to the slots of the stator. Other slot combinations for a stator could also be provided and elements can be fitted relative to the slots even though the number of elements is not integrally divisible into the number of slots in the stator. It is to be understood that a dynamoelectric machine in accordance with the present invention can be operated utilizing all conducting material at all times and that sufficient torque for starting can be obtained even in instances where a winding connection is established whereby certain elements remain relatively neutral or unproductive so far as actual torque is concerned. Such elements which are not utilized for torque purposes to their full potential are referred to as "drones" but as indicated earlier these drones also serve a useful purpose in that they provide a sharper definition of electrical poles. The drone elements are electrically rather than mechanically useful and switching for establishing starting connections can be simplified by using only a few of the elements for starting so as to obtain differing phase relationships sufficient to provide starting torque of a magnitude required for successful operation of the dynamoelectric machine.

It is to be understood that the multi-speed motor in accordance with the present invention can be used in motor control circuits as disclosed in an application identified by S.N. 804,372 also filed April 6, 1959. A dynamoelectric machine in accordance with the present invention wherein all conducting material or copper of the single winding is active at all times is particularly useful in appliances such as a washing machine where operation at different speeds is desirable. However, it is to be understood that the dynamoelectric machine, in accordance with the present invention, is not limited to use in washing machines and that other uses thereof can be made. A two/four pole motor in accordance with the basic teaching of the present invention is disclosed in a copending patent application filed on even date herewith and identified by Serial Number 804,223.

It is to be noted that for 28, 30 and 32 slot embodiments wherein a single unsymmetrically fitted winding in accordance with the present invention is provided, it is possible to establish various elemental polarity in accordance with the following chart:

| Poles | Type | Elements | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| 4-pole | A | n | n | n | s | s | s | n | n | n | s | s | s |
| | B | n | n | s | s | s | n | n | n | s | s | s | n |
| | C | n | s | s | s | n | n | n | s | s | s | n | n |
| 6-pole | X | n | n | s | s | n | n | s | s | n | n | s | s |
| | Y | n | s | s | n | n | s | s | n | n | s | s | n |

The purpose of providing varying types of elemental polarity programs as represented by types A, B and C as well as X and Y for 4 and 6 pole connections respectively, is to vary performance obtainable from unsymmetrical element stator embodiments. For symmetrical winding embodiments the relative north and south polarities n and s for elements will cause no difference in performance. Polarities are to be taken as set forth in the description and as shown in the drawings such as in FIGURES 1, 1a and 1c. The polarities are not to be traced off of diagrammatic representations such as in FIGURE 3a.

It is to be noted that 24 and 36-slot stator winding embodiments involve the same basic principles because all elements are symmetrical such that for 36-slot winding there are three loops or sections per element whereas for 24-slot winding there are two loops or sections per element. Basic connections shown in FIGURES 1, 2c and 3b can be adapted for use on 36-slot, 32-slot and 30-slot embodiments. It is to be understood that in referring to representations of stages 1, 2 and 3 including elements 1–4–7–10, 2–5–8–11 and 3–6–9–12, respectively, it is possible to trade positions of elements of stages 2 and 3 relative to locations thereof in slots so as to facilitate internal connections between elements having differing depth locations relative to the slots and/or for varying and/or modifying performance characteristics.

For variation in starting connections, two groups of elements can be connected in parallel rather than in series relative to a source of line voltage and phase shifting means such as capacitance, resistance, and/or inductance is connected in series with one group such elements 8–7–10–11–4–1 in series with resistance and in parallel with elements 2–12–9–3–6–5. Also, predetermined elements can be wound to have parallel conductors of which only one parallel portion of one group is subjected to phase shifting means. This is similar to use of parallel conductors referred to in application S.N. 804,223 also filed April 6, 1959, as noted earlier.

As to formation of electrical poles, it is noted that for four-pole running operation, five elements are involved in resultant pole-flux integration of a particular pole. For six-pole running operation, four elements are involved in integrating a particular pole. Also, it is to be noted that stator iron can be formed using a plurality of laminations and/or other suitable magnetic core-forming means.

While the embodiments of the invention as herein disclosed constitute preferred forms, it is to be understood that other forms might be adopted.

What is claimed is as follows:

1. For a multi-speed single-phase dynamo-electric machine, a stator means and connecting circuit, comprising, a magnetic core having a plurality of slots therein, a single physically "poleless" winding including a plurality of elements of conducting material fitted into said slots and divisible into a pair of groups of equal number of elements relative to which line voltage can be applied, each group of elements having at least one tap-in lead whereby predetermined elements can be connected in opposite groups such that differing numbers of resultant electrical poles can be established in which conducting material of all of said elements of said single winding is energized and active for all modes of operation including starting and running, and a phase-shifting means adapted to be connected in operative relation with at least one group of said elements of said single winding.

2. In a multi-speed single-phase dynamoelectric machine, a stator means, comprising, a magnetic core having at least 24 slots therein, and a single physically "poleless" winding including a dozen elements of conducting material fitted into said slots, said elements numbering 1–4–7–10 being located radially outwardly near bottoms of said slots of said laminations, said elements numbering 3–6–9–12 being located radially inwardly near tops of said slots of said laminations and said elements numbering 2–5–8–11 being located intermediate and angularly displaced relative to both said radially inner and outer elements.

3. For a multi-speed single-phase dynamoelectric machine, a stator means, comprising, a magnetic core having 36 slots therein, and a single "poleless" winding always energized during operation to include a dozen wound elements each fitted into said stator slots, said elements of said single winding having sides thereof in double-overlapping relation to each other in more than one stage of depth in location relative to said slots and being so arranged and constructed to be connected to provide four and six resultant electrical poles, said dozen elements being connected in series for four-pole operation in a progression 2–12–9–3–6–5–8–7–10–11–4–1 with polarities 2–n, 12–s, 9–n, 3–n, 6–s, 5–s, 8–n, 7–n, 10–s, 11–s, 4–s, and 1–n, respectively and for six-pole operation in progression and polarity 2–n, 12–s, 9–n, 10–n, 7–s, 8–s, 5–n, 6–n, 3–s, 11–s, 4–s, 1–n, wherein letters "n" and "s" indicate north and south elemental polarity which results in establishing definite electrical poles by connection between said elements of said single winding, all of said elements being adapted to be energized and active at all times during all modes of operation including both starting and running operation at differing numbers of electrically identifiable poles.

4. In a multi-speed single phase dynamoelectric machine, a stator means, comprising, a magnetic core having 30 slots therein, and a single "poleless" winding adapted to be energized at all times and including a dozen elements of conducting material each fitted into said slots, four of said elements having a location near a bottom portion of predetermined slots, four further elements having a location near a top portion of other predetermined slots, and four remaining elements having a location angularly and physically intermediate said previously noted elements, said elements covering a span of arcuate distance between slots 1–8, 4–10, 6–13, 9–15, 11–18, 14–20, 16–23, 19–25, 21–28, 24–30, 26–3, and 29–5 for elements 1 through 12, respectively, element one being selected as beginning in slot 1, all of said elements being adapted to be energized at all times during both starting and running operation at differing numbers of electrically identifiable poles.

5. In a multi-speed single-phase dynamoelectric machine, a stator means, comprising, a magnetic core having 30 slots therein, and a single "poleless" winding adapted to be energized at all times and including a dozen elements of conducting material each fitted into said slots, four of said elements having a location near a bottom portion of predetermined slots, four further elements having a location near a top portion of other predetermined slots, and four remaining elements having a location angularly and physically intermediate said previously noted elements, said elements being unsymmetrically fitted into said slots and adapted to be active and energized at all times during all modes of operation including starting and running under four and six poles resulting electrically due to interconnection of elements relative to predetermined tap points, said resulting poles including areas of "drone" conducting material serving a useful purpose by more sharply defining electrical resultant poles.

6. In a multi-speed single-phase dynamoelectric machine, a stator means, comprising, a magnetic core having 24 slots therein, and a single physically "poleless" winding including a dozen elements symmetrically fitted into said slots and each covering a span of three slots in addition to a pair of slots in which opposite sides of each element are placed, said elements being adapted to be energized and active at all times during all modes of operation including running and starting such that differing numbers of resultant electrical poles are formed, said elements being series connected to have a progression in a pair of groups including elements 1–4–2–11–9–12 and elements 3–6–5–8–7–10, said groups including tap connections between elements 4–2 and 11–9 and elements 6–5 and 8–7.

7. In a multi-speed single-phase dynamoelectric machine, a stator means, comprising, a magnetic core having 24 slots therein, and a single physically "poleless" winding including a dozen elements symmetrically fitted into said slots and each covering a span of three slots in addition to a pair of slots in which opposite sides of each element are placed, said elements being adapted to be energized and active at all times during all modes of operation including running and starting such that differing numbers of resultant electrical poles are formed, said elements being in double-overlapping relation to each other and electrically connected to establish resultant four and six poles electrically, said elements being selected to start with element 1 in slot 1, element 2 in slot 3, element 3 in slot 5, etc., such that for four-pole connection elements and polarities, n north, s south, are respectively, 1–n, 2–n, 3–n, 4–s, 5–s, 6–s, 7–n, 8–n, 9–n, 10–s, 11–s and 12–s and for six-pole connection, 1–n, 2–n, 3–s, 4–s, 5–n, 6–n, 7–s, 8–s, 9–n, 10–n, 11–s and 12–s.

8. For a multi-speed single-phase dynamoelectric machine, a stator means and connecting circuit, comprising, a magnetic core having a plurality of slots therein, a single physically "poleless" winding including a plurality of elements of conducting material fitted into said slots and divisible into a pair of groups of equal number of elements relative to which line voltage can be applied, said elements that total twelve in number having two tap-in leads whereby predetermined elements can be connected in opposite groups such that differing numbers of resultant electrical poles can be established in which conducting material of all of said elements of said single winding is energized and active for all modes of operation including starting and running, and a phase-shifting means adapted to be connected in operative relation with at least one group of said elements of said single winding, said differing number of poles being four and six resultant electrical poles obtained selectively by interconnecting said groups of elements between remote and adjacent elements, respectively, so as to have bucking of resultant induced flux integrated into a summation wherein voltage between mechanically adjacent elements is never in excess of line voltage.

9. In a multi-speed single-phase dynamoelectric machine, a stator means, comprising, a magnetic core having 32 slots therein, and a single physically "poleless" winding including a dozen elements of conducting material fitted into said slots, said elements numbering 1–4–7–10 being located radially outwardly near bottoms of said slots of said laminations, said elements numbering 3–6–9–12 being located radially inwardly near tops of said slots of said laminations and said elements numbering 2–5–8–11 being located intermediate and angularly displaced relative to both said radially inner and outer elements, said elements being series-connected into a progression 1–4–6, 7–10–9, 12–11–2, 5–8–3 for four-pole operation and 1–4–6, 2–11–12, 9–10–7, 5–8–3 for six-pole operation.

10. In a multi-speed single-phase dynamoelectric machine, a stator means, comprising, a magnetic core having 30 slots therein, and a single physically "poleless" winding including a dozen elements of conducting material fitted into slots, said elements numbering 1–4–7–10 being located radially outwardly near bottoms of said slots of said laminations, said elements numbering 3–6–9–12 being located radially inwardly near tops of said slots of said laminations and said elements numbering 2–5–8–11 being located intermediate and angularly displaced relative to both said radially inner and outer elements, said elements being adapted to be connected for a progression 1–4–11–7–10–8–5–3–6–9–12–2 for four-pole operation and 1–4–11–6–3–5–8–10–7–9–12–2 for six-pole operation.

11. In a multi-speed single-phase dynamoelectric machine, a stator means, comprising, a magnetic core having 36 slots therein, and a single physically "poleless" winding including a dozen elements of conducting material fitted into said slots, said elements numbering 1–4–7–10 being located radially outwardly near bottoms of said slots of said laminations, said elements numbering 3–6–9–12 being located radially inwardly near tops of said slots of said laminations and said elements numbering 2–5–8–11 being located intermediate and angularly displaced relative to both said radially inner and outer elements, said elements being adapted to be connected for a progression 2–12–9–3–6–5–8–7–10–11–4–1 for four pole operation and 2–12–9–10–7–8–5–6–3–11–4–1 for six pole operation.

12. In a multi-speed single-phase dynamoelectric machine, a stator means, comprising, a magnetic core having at least 24 slots therein, and a single physically "poleless" winding including a dozen elements of conducting material fitted into said slots, said elements numbering 1–4–7–10 being located radially outwardly near bottoms on said slots of said laminations, said elements numbering 3–6–9–12 being located radially inwardly near tops of said slots of said laminations and said elements numbering 2–5–8–11 being located intermediate and angularly displaced relative to both said radially inner and outer elements, said elements of said single winding having conducting material thereof arranged and constructed to be energized at all times during all modes of operation including starting and running under differing numbers of resultant electrical poles.

References Cited in the file of this patent
UNITED STATES PATENTS
2,671,879   Schwarz _____ Mar. 9, 1954